(12) United States Patent
Mominee et al.

(10) Patent No.: US 8,573,543 B2
(45) Date of Patent: *Nov. 5, 2013

(54) CLAMP FOR CIRCULAR OBJECTS

(71) Applicant: ERICO International Corporation, Solon, OH (US)

(72) Inventors: Daniel S. Mominee, Chandler, AZ (US); Raymond M. Olle, Brecksville, OH (US); Michael H.-S. Oh, Twinsburg, OH (US); Raymond S. Laughlin, Middlefield, OH (US); Eric J. Wilson, Solon, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,364

(22) Filed: Oct. 1, 2012

(65) Prior Publication Data

US 2013/0026306 A1  Jan. 31, 2013

Related U.S. Application Data

(63) Continuation of application No. 12/501,631, filed on Jul. 13, 2009, now Pat. No. 8,276,854, which is a continuation of application No. 11/636,134, filed on Dec. 8, 2006, now abandoned.

(60) Provisional application No. 60/749,197, filed on Dec. 9, 2005.

(51) Int. Cl.
*F16L 3/00* (2006.01)
*E04C 2/52* (2006.01)

(52) U.S. Cl.
USPC ............ 248/62; 248/74.1; 248/74.4; 52/219; 52/220.1

(58) Field of Classification Search
USPC ............... 248/62, 74.1, 74.4, 68.1, 59, 230.5, 248/231.61, 231.85, 316.1; 52/219, 220.1, 52/220.6, 220.8, 232, 365, 678
See application file for complete search history.

(56) References Cited

U.S. PATENT DOCUMENTS

| 539,462 A | 5/1895 | Weiant |
| 539,642 A | 5/1895 | Weiant |

(Continued)

FOREIGN PATENT DOCUMENTS

| DE | 19509997 A1 | 9/1996 |
| DE | 29801437 U1 | 3/1998 |

(Continued)

*Primary Examiner* — Tan Le
(74) *Attorney, Agent, or Firm* — Renner, Otto, Boisselle & Sklar, LLP (57) ABSTRACT

A clamp includes first and second parts, each of the parts having a circular central section and a pair of straight extensions extending away from the circular central section in opposite directions. In the first part the holes are closed holes, while in the second part the holes are open holes, connected by slots to an upper edge of the part. Bolts may be pre-located through the closed holes, with nuts threaded onto the bolts, but not tightened. The pre-placed bolts may be received through the slots and into the open holes of the second part. The nuts may then be tightened against the second part to clamp the circular central sections on opposite sides of a circular object, such as a vertical pipe run, between the parts. According to a variant, the bolts are permanently secured to the first part so as to prevent rotation of the bolts.

22 Claims, 4 Drawing Sheets

(56) References Cited

U.S. PATENT DOCUMENTS

| | | | |
|---|---|---|---|
| 1,646,639 A | 10/1927 | Crowell | |
| 1,710,060 A | 4/1929 | Metcalf, Jr. | |
| 2,173,037 A | 9/1939 | Dailey | |
| 3,385,545 A | 5/1968 | Patton | |
| 4,765,106 A | 8/1988 | Modrovich | |
| 4,998,691 A * | 3/1991 | Brown | 248/74.1 |
| 5,161,836 A * | 11/1992 | McKinnon | 285/373 |
| 5,727,762 A | 3/1998 | Cosentino | |
| 5,769,112 A * | 6/1998 | Rendina | 137/316 |
| D489,000 S | 4/2004 | Ellery | |
| 7,010,889 B1 | 3/2006 | Renfro | |
| 7,140,579 B2 | 11/2006 | Kirschner | |
| 7,207,532 B1 * | 4/2007 | Roberts et al. | 248/125.1 |
| 7,784,234 B2 * | 8/2010 | Warmolts et al. | 52/317 |
| 8,100,368 B2 | 1/2012 | Jackson et al. | |
| 8,276,854 B2 | 10/2012 | Mominee et al. | |
| 2005/0230569 A1 | 10/2005 | Kirschner | |

FOREIGN PATENT DOCUMENTS

| | | |
|---|---|---|
| DE | 202004016038 U1 | 1/2005 |
| EP | 0123363 A1 | 10/1984 |
| EP | 0760445 A1 | 3/1997 |
| EP | 13849258 A1 | 1/2004 |
| EP | 1741965 A1 | 1/2007 |

\* cited by examiner

CLAMP FOR CIRCULAR OBJECTS

This is a continuation of U.S. application Ser. No. 12/501,631, filed Jul. 13, 2009, which is a continuation of U.S. application Ser. No. 11/636,134, filed Dec. 8, 2006, now abandoned, which claims priority under 35 USC 119 to U.S. Provisional Application 60/749,197, filed Dec. 9, 2005. All of the above applications are incorporated by reference in their entireties.

BACKGROUND OF THE INVENTION

1. Technical Field of the Invention

This invention relates generally as indicated to clamps for circular objects such as pipes or conduits.

2. Description of the Related Art

Clamps for holding circular objects such as pipes or conduit are commonly used in a wide variety of circumstances, such as to secure the objects to structure, to secure other objects or fixtures to the circular objects, or to otherwise limit movement of the circular objects.

One example of a clamp used for holding circular objects is a riser clamp, used to secure vertical pipe runs, such as in a plumbing stack. A stack is a vertical run of pipe through a building, used for example to vent plumbing drain lines. The vertical run may be several stories high, passing through circular floor openings that are greater in diameter than the diameter of the pipe run.

Figure 1:
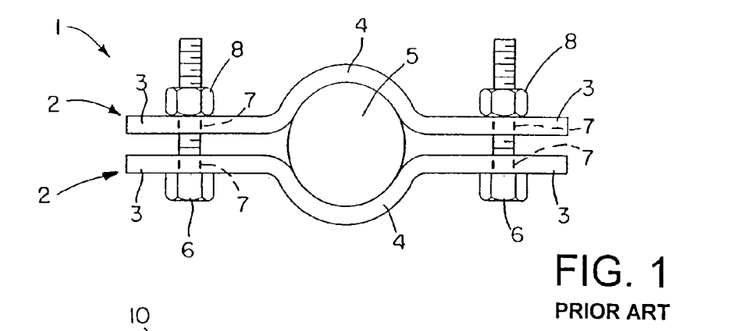
FIG. 1 is a plan view of a prior art riser clamp secured to a pipe run.

These vertical runs of pipe are secured by riser clamps. An example prior art riser clamp 1 is shown in FIG. 1. The riser clamp 1 has a pair of bar portions 2 of rectangular cross-section bar each having a pair of straight ends 3 with a circular portion 4 between the straight ends 3. The bar portions 2 are clamped onto a pipe or conduit 5, with opposite sides of the pipe 5 engaged by surfaces of the circular portions 4. The bar portions 2 are secured onto the pipe 5 by a pair of bolts 6 that pass through holes 7 in the straight ends 3 on either side of the circular portions 4, and nuts 8 that threadedly engage the bolts 6. The nuts 8 are tightened to clamp the pipe 5 securely between the circular portions 4. The circular portions 4 are configured so that the straight ends 3 of the portions 2 do not come into contact when the riser clamp 1 is installed, but rather there is a spacing between the straight ends 3 of one of the bar portions and the corresponding straight ends 3 of the other bar portion.

A riser clamp such as the riser claim 1 is secured to a vertical run of piping just above a circular floor opening though which the pipe run passes. The riser clamp 1 ordinarily rests on the floor, with the straight ends 3 being long enough to extend beyond the circular floor opening. Thus one function of the riser clamp 1 is to prevent vertical movement of the pipe, since the riser clamp 1 is too large to fit through the circular floor opening.

In addition, the riser clamp 1 prevents torquing or tilting of the pipe run. The spacing between the corresponding straight ends 3 of the portions 2 provides a stable base that resists twisting or torquing of the pipe that would otherwise result in tipping of the clamp 1 over an edge of the straight ends 3 of one of the portions 2. In other words, having the corresponding straight ends 3 of the portions 2 separated from each other provides a base that engages the floor around the circular floor opening to prevent undesirable twisting, tilting, and/or torquing of the pipe run.

Nonetheless, there is room for improvement in that the riser clamp 1 involves a large number (six) of separate parts, and two different threading operations. In addition, some care must be taken to provide at least rough symmetry between the tightening of the nuts 7 on opposite sides of the pipe 5, to have proper installation of the riser clamp 1.

From the foregoing it will be appreciated that improvements would be desirable for pipe or conduit clamps in general, and for riser clamps in particular.

SUMMARY OF THE INVENTION

According to an aspect of the invention, a clamp includes a pair of clamp parts, one of which has open slots therein for receiving bolts in holes of the other piece.

According to another aspect of the invention, a clamp has bolts permanently fixed in holes in one its parts, with the bolts permanently unable to rotate relative to the part.

According to yet another aspect of the invention, a clamp includes: a first bar portion having a first curved central section, and a pair of first extensions extending from opposite ends of the first curved central section; a second bar portion having a second curved central section, and a pair of second extensions extending from opposite ends of the first curved central section; and a pair of fasteners joining the bar portions together. The first bar portion has a pair of holes in respective of the first extensions. The second bar portion has a pair of holes in respective of the second extensions. At least one of the holes in the second extensions is an open hole.

According to still another aspect of the invention, a method of installing a clamp around an object to be clamped, includes the steps of: placing respective central curved sections of first and second bar portions on opposite sides of the object to be clamped, wherein the curved sections of the bar portions are between respective pairs of extensions connected to opposite sides of the curved section; and coupling the bar portions together, with the object to be clamped between the central curved sections, wherein the coupling includes passing a shaft of a fastener that is coupled to one of the extensions of the first bar portion, through a slot and into an open hole in one of the extensions in the second bar portion.

According to a further aspect of the invention, a clamp bar portion includes: a central curved section; a pair of extensions connected to opposite ends of the central curved section; and a pair of bolts passing through holes in respective of the extensions; wherein the bolts are fixedly attached to the extensions.

According to a still further aspect of the invention, a clamp includes: a first bar portion having a first curved central section, and a pair of first extensions extending from opposite ends of the first curved central section; a second bar portion having a second curved central section, and a pair of second extensions extending from opposite ends of the first curved central section; and a pair of bolts joining the bar portions together. The first bar portion has a pair of holes in respective of the first extensions. The second bar portion has a pair of holes in respective of the second extensions. At least one of the holes in the second extensions includes means for receiving a bolt shaft of one of the bolts while the bolt shaft is between a bolt head and a nut threaded on the bolt shaft.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A clamp includes first and second parts, each of the parts having a circular central section and a pair of straight extensions extending away from the circular central section in opposite directions. Both of the parts have holes in the straight extensions, on opposite sides of the circular central section. In the first part the holes are closed holes, while in the second part the holes are open holes, connected by slots to an upper edge of the part. Bolts may be pre-placed through the closed holes, with nuts threaded onto the bolts, but not tightened. The pre-placed bolts may be received through the slots and into the open holes of the second part. The nuts may then be tightened against the second part to clamp the circular central sections on opposite sides of a circular object, such as a vertical pipe run, between the parts. The use of open holes and pre-placed bolts facilitates installation of the riser clamp, by reducing the number of parts and installation steps involved in the process. The slots for the open holes may have any of a variety of suitable shapes, including straight vertical, straight diagonal, and an L-shape. Both of the slots in the second part may have the same shape, or the slots may have different shapes.

According to a variant, the bolts are permanently secured to the first part so as to prevent rotation of the bolts. This further simplifies installation, in that there is no need to grip the bolt with a wrench or other tool when the nut is tightened against the second part. The permanently secured bolts may be used in conjunction with a part having open holes. Alternatively, a part having permanently secured bolts may be used in conjunction with a second part having closed holes, with the bolts passed into the closed holes before the nuts are threaded on the bolts.

Figure 2:
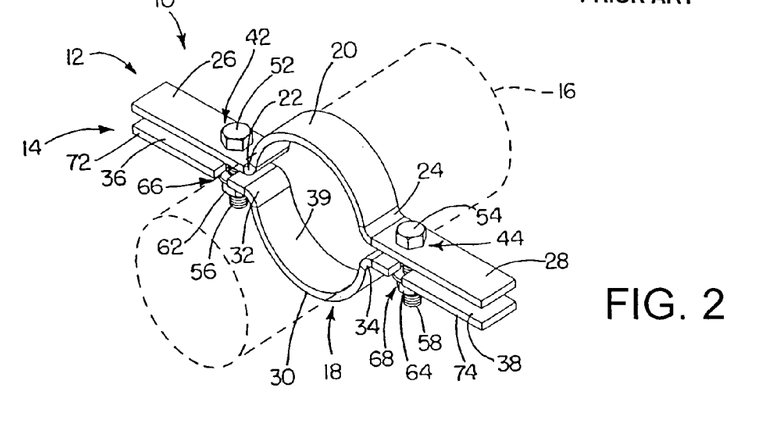
FIG. 2 is an oblique view of a riser clamp in accordance with the present invention.
Figure 3:
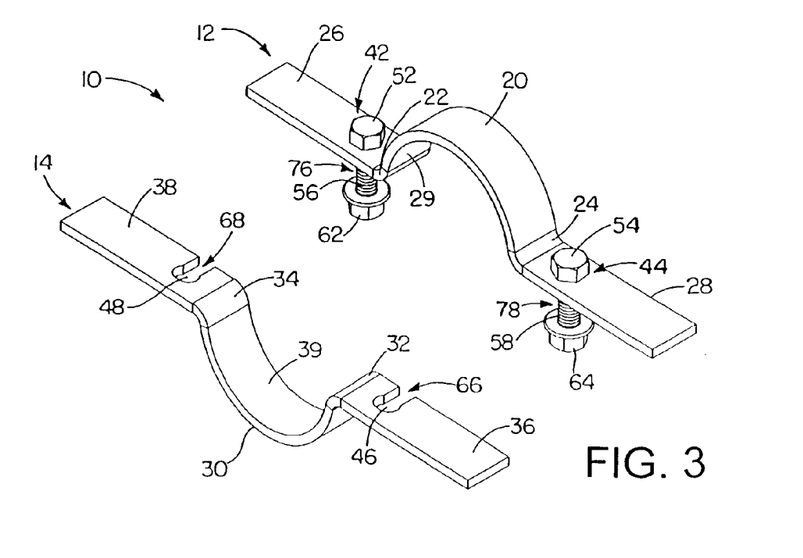
FIG. 3 is an exploded view of the riser clamp of FIG. 2.

Referring to FIGS. 2 and 3, a clamp 10 includes a pair of bar portions 12 and 14 for securing therebetween a circular object 16, such as a pipe or conduit, in a round space 18 between the bar portions 12 and 14. The first bar portion 12 includes a central circular section 20 having radiused bends 22 and 24, curved in opposite direction from the circular section 20. More broadly, the central section 20 is a curved section. The radiused bends 22 and 24 bend back to straight extensions 26 and 28 extending away from the circular section 20. The circular section 20 has an inner surface 29 configured to contact the object 16 when the clamp 10 is installed. The extensions 26 and 28 may be substantially in line with one another, and may be configured to extend outward away from the circular object 16 in opposite, radial and diametrically opposed, directions. With this configuration, the circular section 20 may be substantially a semi-circle. Alternatively, the extensions 26 and 28 may have other configurations, such as being angled at a nonzero angle relative to one another.

The second bar portion 14 has similar parts to those of the first bar portion 12: a central circular (or curved) section 30, a pair of radiused bends 32 and 34 emanating from opposite sides of the central circular section 30, bending back to respective straight extensions 36 and 38 extending away from the circular section 20. The central circular section has an inner surface 39 for engaging a portion of the circular object 16. The circular section inner surfaces 29 and 39 together define the round object-receiving space 18 between the bar portions 12 and 14.

The first bar portion 12 has closed holes 42 and 44 in the respective extensions 26 and 28. The second bar portion 14 has open holes 46 and 48 in the respective extensions 36 and 38. The holes 42, 44, 46, and 48 are used for receiving a pair of bolts 52 and 54, to secure the bar portions 12 and 14 together around the circular object 16. Respective shafts 56 and 58 of the bolts 52 and 54 pass through pairs of the holes 42/46 and 44/48. Nuts 62 and 64 are threaded onto the shafts 56 and 58. The nuts 62 and 64 may be tightened to pull the bar portions 12 and 14 together, clamping the bar portions 12 and 14 against the clamped object 16.

The terms "bolt" and "nut," as used herein, broadly refer to theadedly engagable fasteners. The term "bolt" encompasses such externally threaded fasteners as certain types of screws. The term "nut" encompasses a wide variety of internally threaded parts, such as hex nuts, square nuts, and wing nuts, to give but a few examples. The term "fastener" is used even more broadly, to include non-threaded engaging parts in addition to threaded parts.

The holes 42 and 44 are closed holes in that they are fully surrounded by the material of the first bar portion 12. The term "closed hole" is used herein to refer to a hole that is sufficiently surrounded by material of a bar portion that a bolt only may be inserted into the hole by substantially longitudinally moving the shaft of the bolt into the hole. As illustrated the closed holes 42 and 44 may have an elongate shape that allows some positioning of the bolt shafts 56 and 58 within the closed holes 42 and 44. Alternatively, the closed holes 42 and 44 may have a different suitable shape, such as a circular shape.

Figures 4, 5, 6:
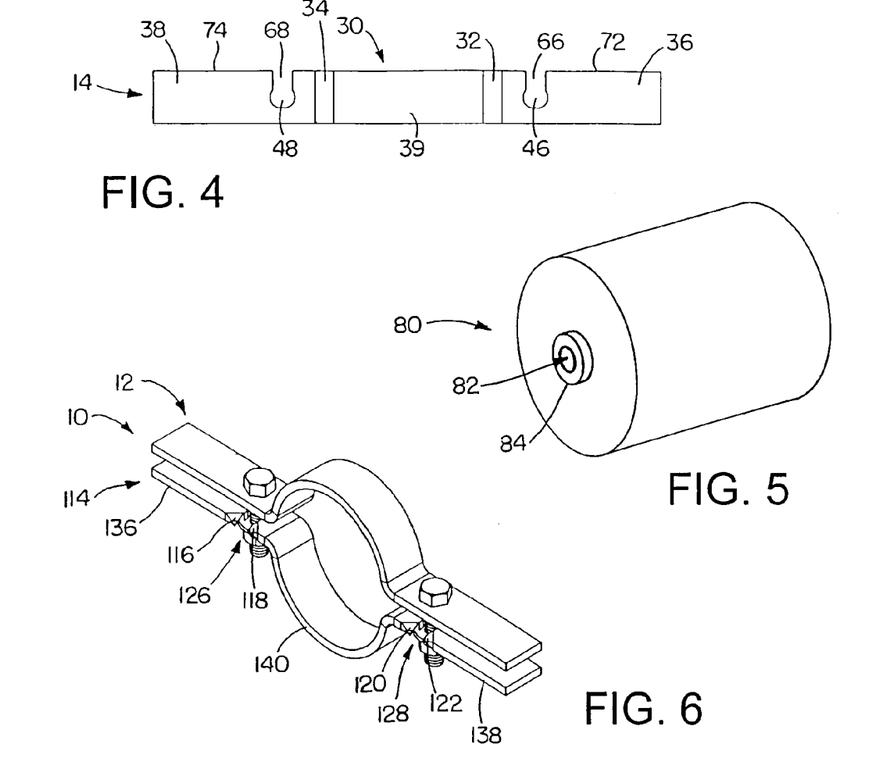
FIG. 4 is a side view of the second bar portion of the clamp of FIG. 2.
FIG. 5 is an oblique view of a stake that may be used in attaching bolts to the first bar portion of the clamp of FIG. 2.
FIG. 6 is an oblique view of an alternate configuration clamp in accordance with the present invention.

With reference now in addition to FIG. 4, the holes 46 and 48 are open holes that are in communication with respective slots 66 and 68 that provide openings to reach the holes through open portions along top edges 72 and 74 of the extensions 36 and 38. The term "open hole" is used herein to refer to a hole that has an open side of sufficient width to allow a bolt shaft to be inserted through the open side into the hole. The open holes 46 and 48 may be generally circular, or may have an elongate shape. The slots 66 and 68 may have a width that is less than that of the open holes 46 and 48 where the slots 66 and 68 link up with the open holes 46 and 48. Alternatively the slots 66 and 68 may have a width that is the same as or greater than that of the open holes 46 and 48.

The open holes 46 and 48 allow the coupling together of the bar portions 12 and 14 without the need for inserting the bolt shafts 56 and 58 through the holes 42/46 and 44/48 while the bar portions 12 and 14 are around the circular object 16. The bolts 52 and 54 may be pre-placed in the first bar portion 12 before the installation process of clamping the bar portions 12 and 14 around the circular object 16. The bolt shafts 56 and 58 may be inserted into the closed holes 42 and 44, with the nuts 62 and 64 threaded onto the bolt shafts 56 and 58. The nuts 62 and 64 are not tightened at this time. Instead, gaps 76 and 78 are left along the bolt shafts 56 and 58, between the first bar portion 12 and the nuts 62 and 64. These gaps 76 and 78 are left so that these open portions of the bolt shafts 56 and 58 may later be inserted into the slots 66 and 68, and from there into the open holes 46 and 48. The clamp 10 may be shipped with the bolts 52 and 54 pre-placed in the first bar portion 12, and with the nuts 62 and 64 threaded onto the bolt shafts 56 and 58.

In the installation process, first the first bar portion 12 is placed against the circular object 16 to be clamped. The circular section inner surface 29 may be placed in contact with the outer the circular object 16.

Then the second bar portion 14 is brought into engagement with the first bar portion 12. The second bar portion 14 is placed on the opposite side of the circular object 16 from the first bar portion 12. The second bar portion 14 may be placed on the circular object 16 below the level of the first bar portion 12, with the top edges 72 and 74 and the open ends of the slots 66 and 68 facing upward. One or both of the bar portions 12 and 14 are then moved to bring the bolt shafts 56 and 58 through the slots 66 and 68 and into the open holes 46 and 48. This may be accomplished by a simple relative vertical movement of the bar portions 12 and 14. Alternatively depending on the shape and/or configuration of the slots 66 and 68, rotation and/or turning of the bar portions 12 and 14 may be performed to bring the bolts 52 and 54 into engagement with the open holes 46 and 48. The bolt shafts 56 and 58 may engage the corresponding slots 66 and 68 substantially simultaneously. Alternatively, one of the bolt shafts 56 and 58 may engage its slot before the other bolt shaft.

After the bolts 52 and 54 are brought into engagement with the open holes 46 and 48, the nuts 62 and 64 are tightened along the bolt shafts 56 and 58. This secures the bar portions 12 and 14 together, with the circular object 16 clamped between them in the round space 18 between the circular sections 20 and 30.

The second bar portion 14 is oriented with the slots 66 and 68 facing upward in order to provide improved load paths for carrying loads on the clamp 10. Alternatively, the second bar portion 14 may be oriented with the slots 66 and 68 facing downward, which may aid in retaining the bolts 52 and 54 engaged with the open holes 46 and 48 during and after installation of the clamp 10.

The bolts 52 and 54 may initially be loose within the closed holes 42 and 44. That is, the bolts 52 and 54 may be able to freely rotate within the closed holes 42 and 44.

Alternatively, the bolts 52 and 54 may be fixedly attached to the first bar portion 12 so that the bolts 52 and 54 are unable to rotate relative to the first bar portion 12. The bolts 52 and 54 may be inserted into the closed holes 42 and 44, and fixed within the holes 42 and 44 relative to the first bar portion 12. The fixing of the bolts 52 and 54 within the holes 42 and 44 may be accomplished by any of a variety of suitable methods.

The extensions 26 and 28 are each longer than the distance between the curves 22 and 24, and the extensions 36 and 38 are each longer than the distance between the curves 32 and 34. The extensions are 26, 28, 36, and 38 are each planar, substantially flat and straight, with no protrusions extending therefrom perpendicular to planes of the extensions 26, 28, 36, and 38. A combined length of the extensions 26 and 28 in directions extending away from the curved central section 20 is greater than a distance between the ends of the curved central section 20, and is greater than a length along an inner surface of the curved central section 20, between the opposite ends of the curved central section 20. A combined length of the extensions 36 and 38 in directions extending away from the curved central section 30 is greater than a distance between the ends of the curved central section 30, and is greater than a length along an inner surface of the curved central section 30, between the opposite ends of the curved central section 30.

One method of attaching the bolts 52 and 54 to the first bar portion 12 is to ring stake the bolts 52 and 54 within the closed holes 42 and 44. For ring staking, the closed holes 42 and 44 may have an initial diameter that is slightly larger than the diameter of the bolt shafts 56 and 58. After the bolt shafts 56 and 58 are inserted into the closed holes 42 and 44, a ring staking operation is used to deform material of the first body portion 12 in the vicinity of the holes 42 and 44. Referring now to FIG. 5, a metal stake 80 is used to accomplish the ring staking. The stake 80 is used to couple the bolts 52 and 54 to the first bar portion 12 sequentially, one at a time. The stake 80 has a central hole 82 for receiving the bolt shafts 56 and 58 when the stake 80 is slammed down against the first body portion 12 in the vicinity of the closed holes 42 and 44. The stake 80 has a sharp edge 84 surrounding the central hole 82, at a diameter slightly greater than the diameter of the closed holes 42 and 44. As the stake 80 is brought into contact with the first bar portion 12 with force, the sharp edge 84 presses into and locally deforms the material of the first bar portion 12. Material of the first bar portion 12 that is radially inward of the sharp edge 84 is pressed radially inward. This constricts the closed holes 42 and 44, clamping the bolt shafts 56 and 58 within the constricted holes. Deformed material of the first bar portion 12 may enter into and engage threads on the bolt shafts 56 and 58. The bolt shafts 56 and 58 are permanently fixed in the closed holes 42 and 44, unable to be rotated within or be removed from the closed holes 42 and 44. The bolts 52 and 54 are thus securely attached to the first bar portion 12.

Alternatively, the closed holes 42 and 44 may be internally threaded holes with threads that engage the threads on the bolt shafts 56 and 58. The bolts 52 and 54 may be threaded into the holes 42 and 44. Following that, ring staking may performed with the stake, as described above. Ring staking the bolts 52 and 54 into internally threaded holes may produce a more secure attachment of the bolts 52 and 54 to the first bar portion 12. However, it will be appreciated that internally threading the holes adds another step in the manufacturing process for the first bar portion 12.

Many alternative methods are available for attaching the bolts 52 and 54 to the first body portion 12. End portions of the bolt shafts 56 and 58, closest to the heads of the bolts 52 and 54, may be knurled, with straight or spiral knurls, to engage the inner surfaces of the holes 42 and 44. The knurling may be done in addition to the ring staking. Or the knurling may be done as an alternative to the ring staking, with the knurled parts of the bolt shafts 52 and 54 being press fit into the closed holes 42 and 44. For press fitting, it is advantageous that the bolts 52 and 54 be made of a material that is harder than the material of the first body portion 12, so that the knurled portions dig into and engage the first body portion 12.

As a further alternative the bolt shafts 56 and 58 may have unthreaded portions near their bolt heads. These unthreaded shoulder portions may be securely engaged by the ring staking process described earlier.

Other alternatives include use of weld studs underneath bolt heads of the bolts 52 and 54. The weld studs have projections that would be resistance welded into place, and compressed onto the first bar portion 12. A further alternative using ring staking would be use of square holes in the first bar portion 12 that would receive carriage bolts. The carriage bolts would be secured in the square holes by ring staking.

Attaching the bolts 52 and 54 to the first bar portion 12 advantageous may reduce the number of tools used in the installation of the clamp 10. With the bolts 52 and 54 attached to the first bar portion 12, there is no need to grip the bolts 52 and 54, such as with a wrench or pliers, to prevent rotation of the bolts 52 and 54 while the nuts 62 and 64 are being tightened along the bolt shafts 56 and 58.

Figure 7:
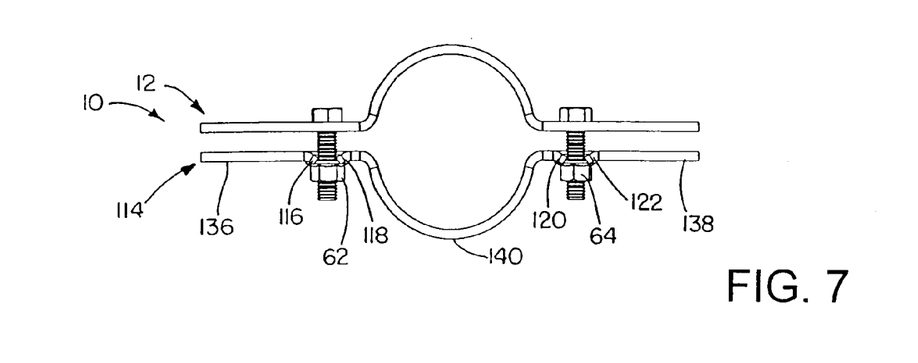
FIG. 7 is an end view of the clamp of FIG. 6.
Figure 8:
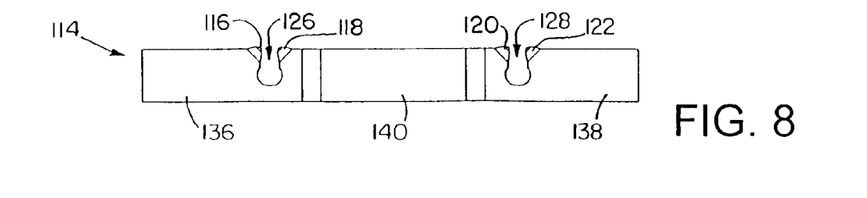
FIG. 8 is a side view of the second bar portion of the clamp of FIG. 6.

FIGS. 6-8 illustrate a variant of the clamp 10, in which a second bar portion 114 has protruding tips 116/118 and 120/122 at ends of its open slots 126 and 128. The protruding tips 116/118 and 120/122 protrude perpendicular to the extensions 136 and 138, in the same direction as the bulge of a central circular section 140. This is toward the side of the second bar portion 114 that contact the nuts 62 and 64. The protruding tips 116/118 and 120/122 may be downward bent corners at the ends of the slots 126 and 128. Alternatively, the protruding tips 116/118 and 120/122 may include added material, such as welded or soldered material. The protruding tips 116/118 and 120/122 aid in keeping the bar portions 12 and 114 coupled together, by keeping the nuts 62 and 64 from passing by the tips unless the nuts are loosened.

The slots 66/68 and 126/128 described above are straight slots, substantially perpendicular to top edges 72 and 74. As such, the slots 66/68 and 126/128 are oriented vertically when the clamp 10 is installed on a vertical pipe run or conduit.

Figure 9:
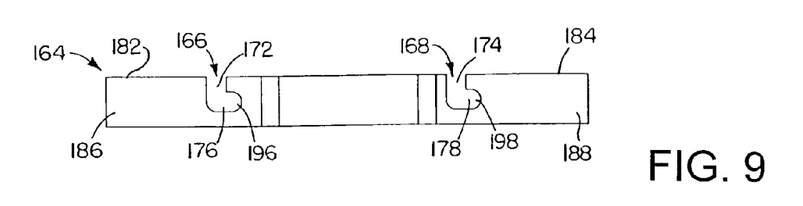
FIG. 9 is a side view of an alternate embodiment second bar portion usable as part of a clamp of the present invention, having a pair of L-shape slots.
Figure 10:
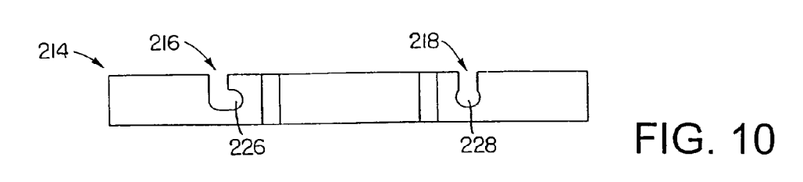
FIG. 10 is a side view of another alternate embodiment second bar portion usable as part of a clamp of the present invention, having one L-shape slot and one vertical slot.
Figure 11:
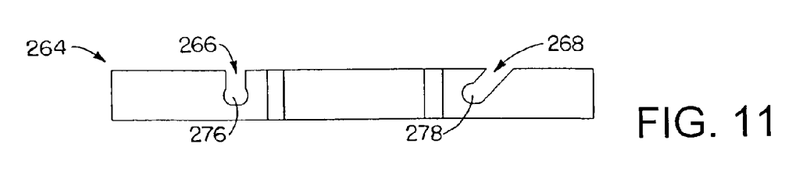
FIG. 11 is a side view of yet another alternate embodiment second bar portion usable as part of a clamp of the present invention, having one diagonal slot and one vertical slot.

FIGS. 9-11 show alternative slot configurations. FIG. 9 shows a second bar portion 164 with L-shape slots 166 and 168. The slots 166 and 168 have respective vertical sections 172 and 174, and respective horizontal sections 176 and 178. The vertical sections 172 and 174 have open ends along top edges 182 and 184 of extensions 186 and 188. The horizontal sections 176 and 178 couple the vertical sections 172 and 174 to open holes 196 and 198. In coupling the second bar portion 164 to the first bar portion 12 (FIG. 2), first the vertical sections 172 and 174 are engaged onto the bolt shafts 56 and 58 (FIG. 2). Then the second bar portion 114 is shifted over so that the bolt shafts 56 and 58 pass through the horizontal sections 176 and 178, and into the open holes 196 and 198.

The use of the L-shape slots 166 and 168 may aid in retaining the bolts 52 and 54 (FIG. 2) within the open holes 196 and 198.

FIG. 10 shows a second bar portion 214 having an L-shape slot 216 and a vertical straight slot 218, in communication with respective open holes 226 and 228. The second bar portion 214 may be engaged to a first bar portion by first engaging one of the bolts with the L-shape slot 216, and then engaging the other of the bolts with the straight slot 218. The L-shape slot 216 may provide advantages in keeping the second bar portion 214 coupled to a first body portion, while avoiding the need to engage two L-shape slots simultaneously.

FIG. 11 shows a second bar portion 264 having a vertical straight slot 266 and a diagonal slot 268, in communication with respective open holes 276 and 278. The diagonal slot 268 is oriented at approximately a 45-degree angle to the vertical, midway between vertical and horizontal directions, although it will be appreciated that the diagonal slot 268 more broadly may be an angled slot oriented in a different direction. The diagonal slot 268 may be engaged with one of the bolts first, with the second bar portion 264 tilted to allow the bolt shaft to pass through the diagonal slot 268 and into the open hole 278. The second bar portion 264 may then be tilted back, and moved to engage the second bolt with the vertical straight slot 266 and the open hole 276.

It will be appreciated that the many other slot configurations are possible. For example, another possible configuration would be a pair of diagonal slots oriented in the same direction.

Further variations are also possible. It will be appreciated that it may be possible to make the bar portions substantially identical to one another, with each of the bar portions having one closed hole and one open hole, perhaps with bolts attached to the closed holes.

Figures 12, 13, 14:
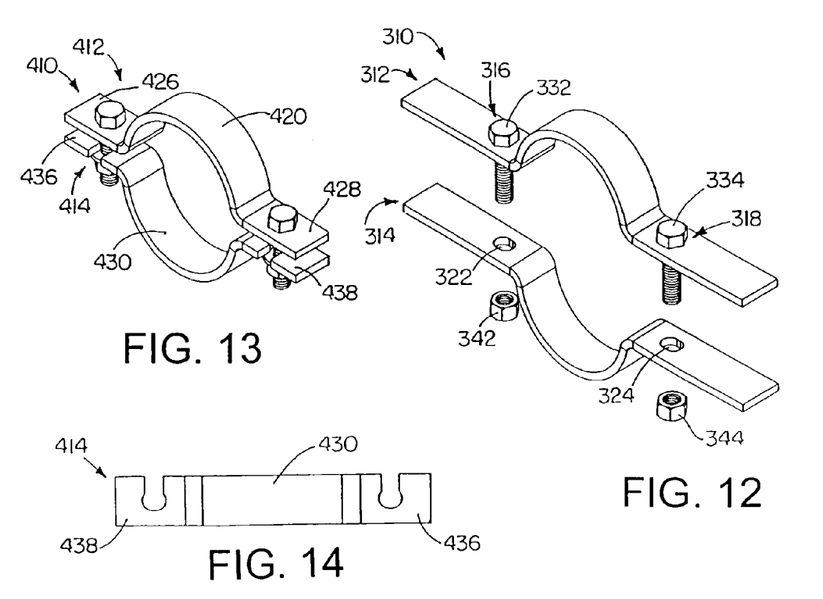
FIG. 12 is an exploded view of an alternate embodiment clamp in accordance with the present invention.
FIG. 13 is an oblique view of another alternate embodiment clamp in accordance with the present invention.
FIG. 14 is a side view of the second bar portion of the clamp of claim 13.

FIG. 12 shows an alternative clamp 310 in which the bar portions 312 and 314 have respective pairs of closed holes 316/318 and 322/324. Bolts 332 and 334 are attached to the first bar portion 312, using any of the variety of suitable attaching mechanisms described above. The clamp 310 still requires nuts 342 and 344 to be threaded onto the bolts 332 and 334 during installation, rather than having nuts pre-threaded onto bolts. However, the clamp 310 does require fewer parts and/or fewer installation tools than conventional presently-used riser clamps.

FIGS. 13 and 14 show another alternate embodiment clamp 410 that is similar in many ways to the clamp 10 (FIG. 2). Like the clamp 10, the clamp 410 has a pair of bar portions 412 and 414. The bar portion 412 has a pair of straight extensions 426 and 428 that extend outward from opposite sides of a circular section 420, and the bar portion 414 has a pair of straight extensions 436 and 438 that extend outward from opposite sides of a circular section 430. The clamp 410 differs from the clamp 10 in that the extensions 426, 428, 436, and 438 are shorter than the extensions 26, 28, 36, and 38 (FIG. 2) of the clamp 10. In other respects the clamp 410 is similar to the clamp 10 or alternate embodiments described above.

Figure 15:
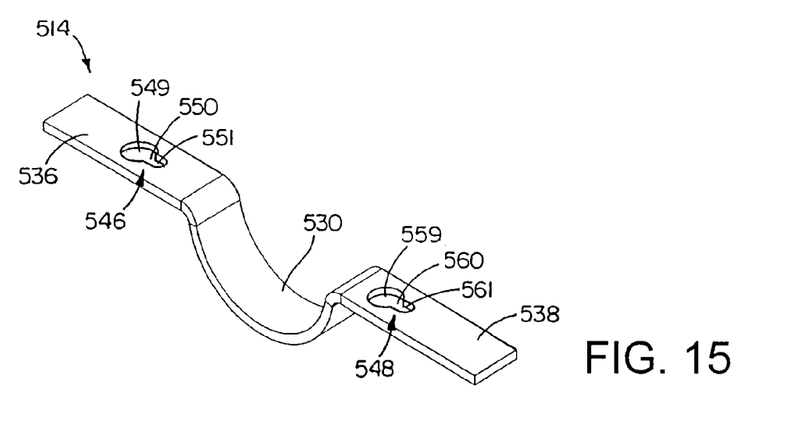
FIG. 15 is an oblique view of still another alternate embodiment second bar portion usable as part of a clamp of the present invention, having keyhole-shape closed slots arrayed in a horizontal orientation (along the length of extensions of the second bar portion)
Figure 16:
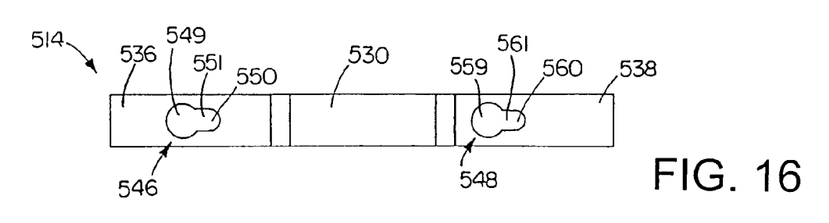
FIG. 16 is a side view of the second bar portion of FIG. 15.

FIGS. 15 and 16 show an alternative embodiment second bar portion 514, usable with the first bar portion 12 (FIG. 2), or a variation thereof. The bar portion 514 has extensions 536 and 538 that extend outward from opposite sides of a circular section 530. The extensions 536 and 538 have respective closed keyhole-shape slots 546 and 548. The slot 546 has a larger-diameter portion 549 and a smaller-diameter portion 550, connected to each other by a slot channel 551. The larger-diameter portion 549 is large enough to allow passage of a nut, such as the nuts 62 and 64 (FIG. 2). The slot channel 551 and the smaller-diameter portion 550 are wide enough to allow a bolt shaft, such as the bolt shafts 56 and 58 (FIG. 2), to enter them. However, the slot channel 551 and the smaller-diameter portion 550 are too narrow to allow a nut threaded on the bolt shaft to pass through.

The slot 548 has similar parts: a larger-diameter portion 559, a smaller-diameter portion 560, and a slot channel 561. The slots 546 and 548 are oriented in the same way, so that the location of the larger-diameter portion 549 relative to the smaller-diameter portion 550 is the same as the location of the larger-diameter portion 559 relative to the smaller-diameter portion 560. As illustrated in FIGS. 15 and 16, the larger-diameter portions 549 and 559 are to the left of the respective smaller-diameter portions 551 and 561 of the slots. The larger-diameter portion 549 is relatively distal, that is farther than the smaller-diameter portion 551 from the central circular section 530. In contrast, the larger-diameter portion 559 is relatively proximal, that is closer than the smaller-diameter portion 561 to the central circular section 530. The smaller-diameter portions 551 and 561 may be located along their respective extensions 536 and 538 at substantially the same distance from the central circular section 530.

The bar portion 514 may be utilized with a first bar portion having nuts pre-installed on bolts, whether or not the bolts are fixedly attached to the first bar portion. The first bar portion, such as the first bar portion 12 (FIG. 2), is placed against an object to be clamped, such as a circular object. Then the bar portion 514 is brought into engagement with the first bar portion. The pre-installed nuts are passed through the larger-diameter ends 549 and 559 of the slots 546 and 548. The bar portions are then translated relative to one another so that the bolt shafts are now in the smaller-diameter ends 551 and 561 of the slots 546 and 548, with the second bar portion 514 between the nuts and the first bar portion. This relative translation is in a direction along the lengths of the extensions 536 and 538, and may accomplished by moving either bar portion, or both bar portions. After the translation, the nuts are then tightened to securely clamp the circular object between the first and second bar portions. The installation process advantageously only requires two separate parts to be handled in the vicinity of the object to be clamped.

Figures 17, 18:
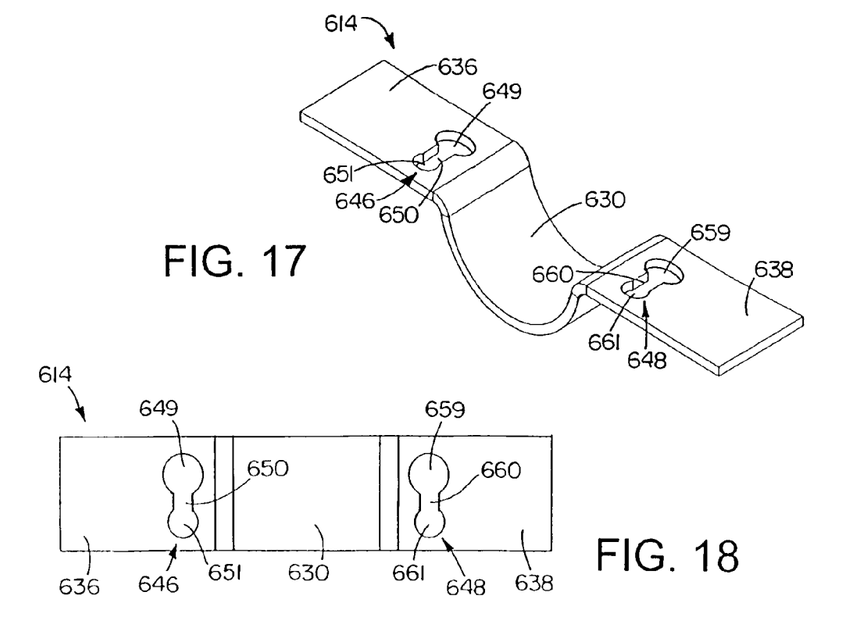
FIG. 17 is an oblique view of still another alternate embodiment second bar portion usable as part of a clamp of the present invention, having keyhole-shape closed slots arrayed in a vertical orientation (along the width of extensions of the second bar portion)
FIG. 18 is a side view of the second bar portion of FIG. 17.

FIGS. 17 and 18 show a variant on the keyhole slot concept described above. A second bar portion 614 includes a pair of keyhole-shape closed slots 646 and 648 in extensions 636 and 638 that are at opposite ends of a central circular section 630. The slots 646 and 648 have a similar shape to the closed keyhole-shape slots 546 and 548 (FIG. 15) of the bar portion 514 (FIG. 15). But whereas the slots 546 and 548 are oriented horizontally, with the larger-diameter portions 549 and 559 alongside the smaller-diameter portions 551 and 561 along the lengths of the extensions 536 and 538 (FIG. 15), the slots 646 and 648 are oriented vertically. That is, larger-diameter portions 649 and 659 are alongside smaller-diameter portions 651 and 661 along widths of the extensions 636 and 638. This makes the bar portion 614 wider than the bar portion 514. However, the change in orientation of the slots may make for easier installation of the clamp, since relative translation of the bar portions in a vertical direction (in the direction of the axis of the circular object, and along the widths of the extensions 636 and 638) may be easier than relative translation in a horizontal direction (perpendicular to the axis of the object being clamped. A clamp that requires horizontal relative translation may require a greater initial clearance between the bar portions and the object to be clamped, in order to avoid interference from the object when coupling the bar portions.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A riser clamp comprising:
    a first bar portion having a first curved central section, and a pair of first extensions extending from opposite ends of the first curved central section;
    a second bar portion having a second curved central section, and a pair of second extensions extending from opposite ends of the second curved central section; and
    a pair of fasteners joining the bar portions together;
    wherein the first bar portion has a pair of holes in respective of the first extensions;
    wherein the second bar portion has a pair of holes in respective of the second extensions;
    wherein both of the holes in the second extensions are open holes that are in communication with slots that extend to edges of the second extensions, wherein the slots allow shafts of the fasteners to enter the open holes through the slots;
    wherein a combined length of the first extensions in directions extending away from the first curved section is greater than a distance between the ends of the first curved central section;
    wherein a combined length of the second extensions in directions extending away from the second curved section is greater than a distance between the ends of the second curved central section; and
    wherein the first extensions and the second extensions are each planar, with no protrusions extending therefrom perpendicular to planes of the extensions.

2. The riser clamp of claim 1,
    wherein the combined length of the first extensions is greater than a length along an inner surface of the first curved central section, between the opposite ends of the first curved central section; and
    wherein the combined length of the second extensions is greater than a length along an inner surface of the second curved central section, between the opposite ends of the second curved central section.

3. The clamp of claim 1, wherein the holes in the first bar portion are closed holes.

4. The clamp of claim 1, wherein at least one of the slots is a straight slot substantially perpendicular to an edge of one of the second extensions.

5. The clamp of claim 1, wherein at least one of the slots is an L-shape slot.

6. The clamp of claim 1, wherein at least one of the slots is a diagonal slot, angled to an edge of one of the second extensions.

7. The clamp of claim 1, wherein the slots have the same shape.

8. The clamp of claim 1, wherein the slots have different shapes.

9. The clamp of claim 1, wherein at least one of the fasteners is attached to the first portion.

10. The clamp of claim 1, wherein the fasteners are bolts.

11. The clamp of claim 10,
wherein the bolts have respective shafts;
further comprising nuts threaded on the shafts; and
wherein bolt heads of the bolts are against the first extensions, and the nuts are against the second extensions.

12. The clamp of claim 1,
wherein the first curved section is a first circular section; and
wherein the second curved section is a second circular section.

13. The clamp of claim 1, wherein the planes include:
a first plane that the first extensions are co-planar in; and
a second plane that the second extensions are co-planar in.

14. The clamp of claim 13, wherein the first plane is substantially parallel to the second plane.

15. The clamp of claim 1, wherein the fasteners pre-placed in the holes of the first bar portion, prior to the joining of the bar portions together.

16. The clamp of claim 15,
wherein the fasteners are bolts;
wherein the bolts have respective shafts;
further comprising nuts threaded on the shafts when the bolts are pre-placed on the first bar portion; and
wherein bolt heads of the bolts are against the first extensions, and the nuts are against the second extensions.

17. The clamp of claim 1,
wherein the first curved central section has first radiused bends at the opposite ends of the first curved central section, wherein the first radiused bends are curved in an opposite direction from the rest of the first curved central section; and
wherein the second curved central section has second radiused bends at the opposite ends of the second curved central section, wherein the second radiused bends are curved in an opposite direction from the rest of the second curved central section.

18. The clamp of claim 1,
wherein the first extensions extend away from the first curved central section in respective opposite directions; and
wherein the second extensions extend away from the second curved central section in respective opposite directions.

19. A riser clamp comprising:
a first bar portion having a first curved central section, and a pair of first extensions extending from opposite ends of the first curved central section;
a second bar portion having a second curved central section, and a pair of second extensions extending from opposite ends of the second curved central section; and
a pair of fasteners joining the bar portions together;
wherein the first bar portion has a pair of holes in respective of the first extensions;
wherein the second bar portion has a pair of holes in respective of the second extensions;
wherein both of the holes in the second extensions are open holes that are in communication with slots that extend to edges of the second extensions;
wherein a combined length of the first extensions in directions extending away from the first curved section is greater than a distance between the ends of the first curved central section;
wherein a combined length of the second extensions in directions extending away from the second curved section is greater than a distance between the ends of the second curved central section;
wherein the first extensions and the second extensions are each planar, with no protrusions extending therefrom perpendicular to planes of the extensions;
wherein the holes in the first bar portion are closed holes;
wherein the slots allow shafts of the fasteners to enter the open holes through the slots;
wherein at least one of the slots are straight slots substantially perpendicular to edges of the second extensions;
wherein the first curved central section has first radiused bends at the opposite ends of the first curved central section, wherein the first radiused bends are curved in an opposite direction from the rest of the first curved central section; and
wherein the second curved central section has second radiused bends at the opposite ends of the second curved central section, wherein the second radiused bends are curved in an opposite direction from the rest of the second curved central section.

20. The riser clamp of claim 19,
wherein the combined length of the first extensions is greater than a length along an inner surface of the first curved central section, between the opposite ends of the first curved central section; and
wherein the combined length of the second extensions is greater than a length along an inner surface of the second curved central section, between the opposite ends of the second curved central section.

21. The riser clamp of claim 19,
wherein the first curved central section and the second curved section define a round space therebetween for receiving a circular object;
wherein the first extensions extend away from the first central circular section in opposite radial and diametrically-opposed directions; and
wherein the second extensions extend away from the second central circular section in opposite radial and diametrically-opposed directions.

22. The riser clamp of claim 1,
wherein the first curved central section and the second curved section define a round space therebetween for receiving a circular object;
wherein the first extensions extend away from the first central circular section in opposite radial and diametrically-opposed directions; and
wherein the second extensions extend away from the second central circular section in opposite radial and diametrically-opposed directions.

* * * * *